Dec. 18, 1962 G. SABADASH 3,068,666
TORQUE TRANSMITTING DEVICE
Filed Dec. 16, 1959

GEORGE SABADASH,
INVENTOR.
WHANN & McMANIGAL
Attorneys for Applicant

United States Patent Office 3,068,666
Patented Dec. 18, 1962

3,068,666
TORQUE TRANSMITTING DEVICE
George Sabadash, 1402 The Strand,
Hermosa Beach, Calif.
Filed Dec. 16, 1959, Ser. No. 859,928
4 Claims. (Cl. 64—15)

The present invention relates generally ot torque transmission means, and is more particularly concerned with a flexible structure for such purpose, which may be embodied into a flexible shaft or flexible coupling for interconnecting shafts or members.

It has heretofore been known to utilize a coiled spring for flexible shafts and couplings, but such structures have been notably ill-adapted for certain types of uses, mainly as a result of inherent characteristics, a few of which may be mentioned as follows:

(1) Coiled springs are not adapted to being fabricated into small or miniature structures which may be utilized for the transmission of torque between connected elements.

(2) A coil spring with the desired lateral and/or axial flexibility has an objectionable windup, that is, permits relative rotational movements between its ends, which is undesirable in many installations.

(3) A coil spring with the desired torsional capacity imposes severe loads on connected shafts and adjacent bearings.

(4) In order to utilize a coiled spring as a torque transmitting medium, additional means are required for anchoring the spring ends, thus complicating the structure and increasing its unsuitability particularly where reliability and space are at a premium.

Having in mind the inherent disadvantages and inadaptability of presently known torque transmission means as enumerated above, the present invention has for one object the provision of an improved flexible torque transmitting means which may be incorporated into a flexible shaft or a coupling for connecting driving and driven shafts.

A further object is to provide an improved means as herein described, which is particularly adapted for incorporation into very small or miniature flexible shafts or couplings.

A further object is to provide such a device which incorporates a flexible section integrally formed with rigid end members.

A still further object is to provide a flexible coupling in which there will be little or no windup or relative rotational movements between the ends thereof.

Another object is to provide an improved torque transmission means embodying the characteristics of lateral flexibility and torsional stiffness.

Yet another object is to provide in flexible torque transmission means of the type described herein, unique means for stabilizing the inner most portions of the helical turns along the axis of the helix.

Still another object is to provide flexible torque transmission means which includes a helically extending flexible section having a cross sectional thickness in the direction of the helix axis, which increases as the ends of the helix are approached.

Further objects of the invention will be brought out in the following part of the specification, wherein detailed description is for the purpose of fully disclosing the invention without placing limitations thereon.

Referring to the accompanying drawings, which are for illustrative purposes only:

Referring now generally to the drawings, the present invention, for illustrative purposes, has been shown as being embodied in a flexible coupling structure. It will be appreciated, however, that the invention is not to be specifically limited to so-called flexible couplings, such as might be utilized for interconnecting a driving shaft with a driven shaft, since the novel embodiment may with equal facility be incorporated into a flexible shaft which differs from a coupling only in that it may be longer.

Figure 1:
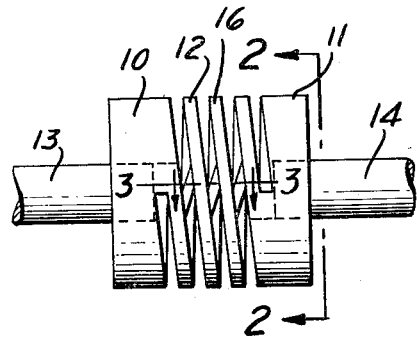
FIG. 1 is an elevational view of a flexible torque transmission device embodying features of the present invention.
Figure 2:
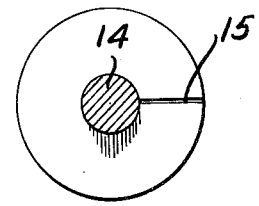
FIG. 2 is a transverse sectional view through one of the connected shafts, taken substantially on line 2—2 of FIG. 1 and showing features of construction of one end of the coupling.

As shown primarily in FIG. 1 of the drawings, the coupling of the present invention embodies a pair of rigid end members 10 and 11, these end members being interconnected by means of a flexible section as generally indicated by the numeral 12. As disclosed, the end members are respectively connected with shafts 13 and 14 either one of which may be the drive shaft, while the other will constitute the driven shaft.

Various means may be provided in association with the ends 10 and 11 for connection with driving means and power delivery means. For example, integrally formed flanges, gears, shafts, clutch and brake components, may be utilized depending upon installation requirements. For illustrating the device herein, the ends are shown as being provided with a radial slot 15 whereby the associated shafts, as shaft 14 will be grippingly engaged.

The ends 10 and 11 and the flexible section 12 are formed integrally, the flexible section 12 being machined or otherwise fabricated of the same piece of material as that used for the ends 10 and 11.

Figure 3:
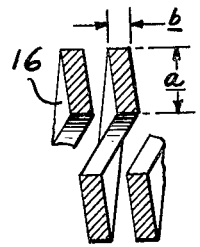
FIG. 3 is a diametric fragmentary section, taken substantially on line 3—3 of FIG. 1.

As shown in FIG. 3, the flexible section 12 is in the form of a strip 16 having the form of a helix, the ends of the helix being integral respectively with the ends 10 and 11. It will be observed, that the strip has a substantially rectangular cross section, as shown in FIG. 3, and in effect is in an edgewise position surrounding the axis of the helix so that its cross sectional dimension $a$ is greater than its axial thickness $b$. Also, as thus constructed the helical slot between adjacent turns is shown as being substantially equal to the thickness $b$. By constructing the flexible section in this manner, it is possible to obtain lateral flexibility and torsional stiffness so that there will be substantially no windup or relative rotational movement between the ends during the transmission of torque betwen shafts which are out of alignment. While the coupling illustrating the embodiment of the present invention therein is illustrated as being relatively short, it will be appreciated that by making the flexible section 12 of greater length it is possible to transmit torque between components whose axes are as much as 180° apart.

Figure 4:
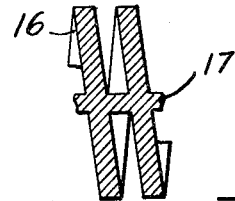
FIG. 4 is a similar view illustrating a modified structure.

It will of course be appreciated that the radial thickness of the strip 16 as indicated at $a$ may be varied, and if desired may be carried entirely to the helix axis. Further for certain types of installation it may be found desirable to centrally terminate the helical slot between adjacent turns so as to leave an axially extending core or integrally formed thread portion 17, as shown in FIG. 4. This core portion thus interconnects the inner edges of the strip and acts to provide in effect an anchor between adjacent edges of the turns which acts to substantially retain the spacing between the strip edges along the helix axis, which helps distribute the stresses and stabilize the adjacent inner edges. In some installations, this stabilizing effect is a very desirable feature.

Figure 5:
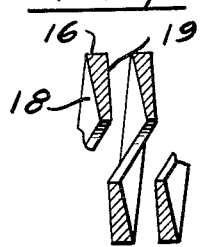
FIGS. 5 and 6 are similar views illustrating further modifications thereof.

Referring to FIG. 5, there is shown a helical strip 16 having a modified cross section in which the opposite faces of the strip as indicated by the numerals 18 and 19, are in converging relation in a direction toward the helix axis instead of being in substantially parallel relation as shown in FIG. 3. By utilizing the construction shown in FIG. 5, the spacing between the innermost edges of the strip adjacent the helix axis will be greater than the normal spacing between the peripheral edges of the helical turns.

Figure 6:
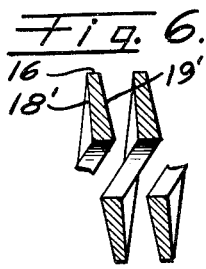

In FIG. 6, there is shown a modified cross section which is substantially a reversal of that shown in FIG. 5. In the modification depicted in FIG. 6, the opposite faces of the strip, as indicated by the numerals 18′ and 19′, are in a converging relation in a direction outwardly away from the helix axis. Thus, the spacing in the helical slot between adjacent turns will be less adjacent the helix axis than at the peripheries of the turns. This modification results in a structure which is most suitable for certain types of fabrication, for example, molding, casting, etc.

Figure 7:
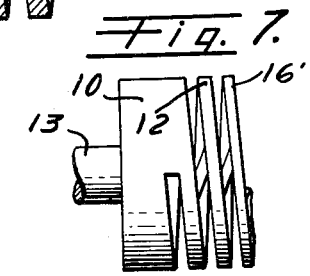
FIG. 7 is a fragmentary elevational view of one end of a device, such as shown in FIG. 1, except that the flexible section has been modified with respect to its cross sectional thickness in the direction of the helix axis.

Referring now to FIG. 7, there is disclosed a modification wherein the strip 16′ differs from that shown in FIG. 1 in that the strip thickness in the direction of the helix axis increases as the point of connection with the associated end member is approached. The thickened strip portions adjacent the two end members operates to minimize flexure stresses at the ends of the helix.

Various modifications may suggest themselves to those skilled in the art without departing from the spirit of my invention, and, hence, I do not wish to be restricted to the specific form shown or uses mentioned, except to the extent indicated in the appended claims.

I claim:

1. Flexible torque transmitting means, comprising: a pair of end members; a multiturn helically extending strip having connection at its ends respectively with said end members, said strip having a cross section with its greatest dimension extending radially of the helix axis, said strip turns being spaced apart at their peripheral margins, and means interconnecting said strip turns at the helix axis.

2. Flexible torque transmitting means, comprising: a pair of end members; a multiturn helically extending strip having connection at its ends respectively with said end members, said strip having a cross section with its greatest dimension extending radially of the helix axis, said strip turns being spaced apart at their peripheral margins, and an axial connection between said strip turns at their inner margins extending axially of said helix for substantially retaining the spacing between the inner margins of said strip turns.

3. Flexible torque transmitting means, comprising: a pair of end members; a multiturn helically extending strip having connection at its ends respectively with said end members, said strip having a cross section with its greatest dimension extending radially of the helix axis, said strip turns being spaced apart at their peripheral margin; and a connection between said strip turns at their inner margins extending axially of said helix for substantially retaining the spacing between the inner margins of said strip turns, said connection being integrally formed with said strip.

4. Flexible torque transmitting means comprising: a metallic helical connecting member having turns extending radially from an integral axial core, and a pair of end members, said connecting member and end members being integrally formed.

References Cited in the file of this patent

UNITED STATES PATENTS

| | | |
|---|---|---|
| 1,429,580 | Geiger | Sept. 19, 1922 |
| 2,480,783 | Sloan | Aug. 30, 1949 |
| 2,888,128 | Allen | May 26, 1959 |

FOREIGN PATENTS

| | | |
|---|---|---|
| 137,424 | Great Britain | Jan. 15, 1920 |
| 468,420 | Great Britain | 1937 |